July 11, 1961 P. E. AXON ET AL 2,991,950

REELING APPARATUS

Filed June 1, 1959 2 Sheets-Sheet 1

INVENTORS.
PETER ERIC AXON
CECIL HENOCQ
BY William J. Flynn
Attorney

July 11, 1961 P. E. AXON ET AL 2,991,950

REELING APPARATUS

Filed June 1, 1959 2 Sheets-Sheet 2

INVENTORS,
PETER ERIC AXON
CECIL HENOCQ
BY William J. Flynn
attorney

United States Patent Office 2,991,950

Patented July 11, 1961

2,991,950

REELING APPARATUS

Peter Eric Axon, London, and Cecil Henocq, Haywards Heath, Sussex, England, assignors to Clevite Corporation, Cleveland, Ohio, a corporation of Ohio Filed June 1, 1959, Ser. No. 817,119

2 Claims. (Cl. 242—55.14)

Figure 1:
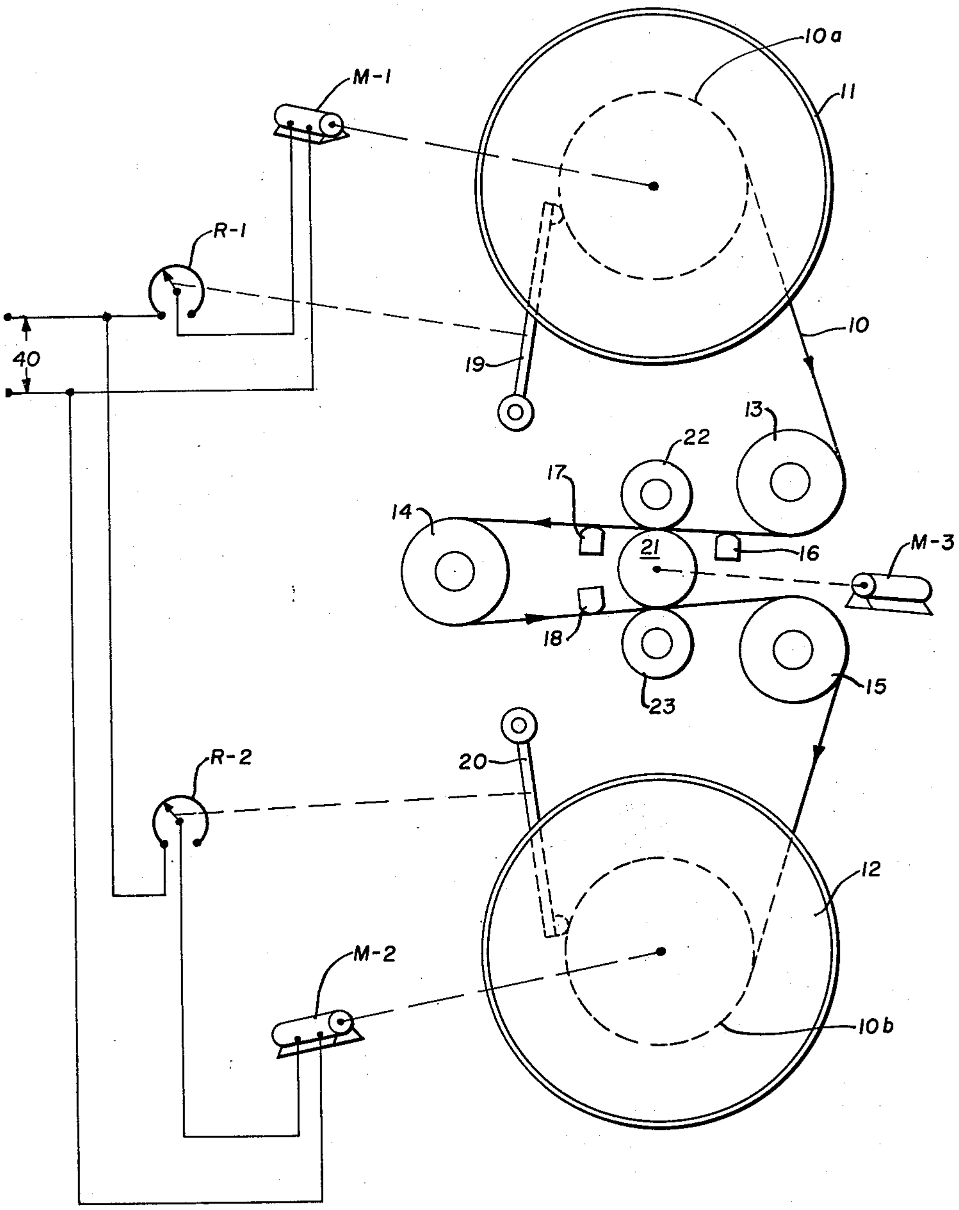

This invention relates to reeling apparatus of the type in which a tape or other elongated web is wound onto, or unwound from, a motor-driven reel and in which it is required to maintain the linear speed of such tape or web substantially constant.

The reeling apparatus of the present invention is particularly advantageous for use in magnetic recording and/or reproducing equipment of the type disclosed and claimed in the co-pending application of Peter Eric Axon, Serial No. 806,122, filed April 13, 1959. In that equipment, a flexible magnetic tape is unwound from a rotary supply reel and is advanced along a predetermined path of movement for recording or reproduction and then is taken up by a rotary take-up reel. The linear speed of the tape along said predetermined path of movement is of the order of 200 inches per second and it is imperative that such linear speed of the tape be maintained substantially uniform. The take-up reel is driven in a forward direction, that is, in a direction to pull the tape from the supply reel and advance it along its predetermined path of movement. The supply reel is driven by a motor which applies to it a torque in the reverse direction in order that the tape will be maintained under the desired tension. In accordance with the invention of said co-pending application, the speeds of the respective reel motors are controlled in accordance with the angular positions of pivoted fingers, each of which engages the outside of the roll of tape on the respective reel. As the tape is progressively unwound from the supply reel and is wound up on the take-up reel, the resulting changes in the angular positions of these fingers control the respective reel motors in such a manner that the linear speed and tension of the tape will remain substantially constant.

While the arrangement of said co-pending application has been found to be eminently well suited for its intended purpose, difficulty has been encountered due to eccentricities of the roll of tape on either reel. The tape on each reel is, in fact, a closely-wound spiral rather then being a circle which is perfectly concentric with the axis of the reel. Moreover, there may be several splices in the tape, involving overlap or the application of adhesive joining strips. Also, the tape reel may not be perfectly true with respect to its axis of rotation. Consequently, the pivoted finger which engages the outermost layer of the tape on the reel may oscillate slowly as it follows the eccentricity of the outer layer of tape when the reel rotates. For proper operation, such oscillating motion of the fingers should not affect the speeds of the respective reel motors.

The present invention is directed to a novel arrangement which insures that any such oscillating motion of the fingers does not affect the speeds of the respective reel motors. At the same time the arrangement of the present invention does not adversely affect the desired speed control of the reel motors in response to changes in the amounts of tape on the supply reel and the take-up reel, respectively.

In accordance with the present invention, this result is achieved by providing a lost-motion coupling between each such tape-engaging finger and the speed control for the respective reel motor. Because of such coupling, any oscillation of the finger due to tape eccentricities will not produce corresponding changes in the speed control for the respective reel motor.

The present invention is particularly applicable to magnetic tape recording and/or reproducing apparatus of the type disclosed and claimed in said earlier-filed co-pending application. However, the present invention is not limited in its practical utility to this particular type of apparatus, but may be used in other types of equipment where it is desired to maintain constant the linear speed of an elongated tape or web which is to be unwound from one reel and/or taken up by another reel.

Accordingly, it is an object of this invention to provide a novel and improved reeling apparatus for controlling the speed of an elongated tape or web.

It is also an object of this invention to provide such a reeling apparatus which automatically compensates for any eccentricity in the tape on a reel.

Further objects and advantages of this invention will be apparent from the following detailed description of a presently preferred embodiment thereof, which is illustrated in the accompanying drawings.

Figure 2:
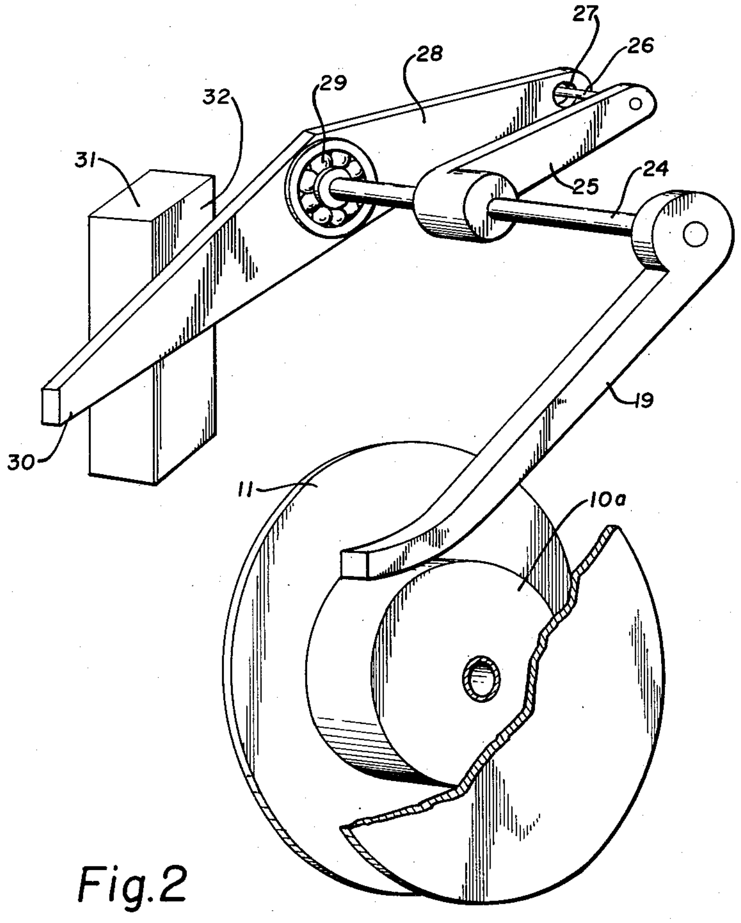

In the drawings:

FIGURE 1 is a schematic view showing a tape transport mechanism in a magnetic recording and/or reproducing apparatus in which the present invention may advantageously be employed; and FIGURE 2 is a schematic perspective view showing the lost-motion coupling of the present invention, operating in conjunction with one of the reels in the tape transport mechanism of FIGURE 1.

Referring first to FIGURE 1, the tape transport mechanism shown therein is the sbuject of the earlier-filed copending application referred above. This tape transport mechanism is shown herein to illustrate one practical application of the present invetnion.

The tape transport mechanism includes a supply reel 11, a take-up reel 12, rotary pulleys or guide rollers 13, 14 and 15 between the supply and take-up reels, and a capstan 21. A flexible magnetic tape 10, which initially is wound up in a roll on the supply reel 11, is advanced from the supply reel across pulley 13, past one side of capstan 21, around the second pulley 14, past the opposite side of capstan 21, and around the third pulley 15 to the take-up reel 12. The take-up reel is driven in a forward direction (i.e., in a direction for unwinding the tape from the supply reel) while the supply reel is driven in the reverse direction, so that the tape is maintained under the desired constant tension between the reels. The take-up reel 12 is over-driven with respect to the supply reel 11, so that it overcomes the backward torque of the supply reel and causes the tape to advance along the path described. An erase head 16, a recording head 17, and a reproducing or playback head 18 are located along the path of movement of the magnetic tape. Pressure rollers 22 and 23 are positioned to pinch the tape 10 against the opposite sides of the capstan 20 when it is desired to advance the tape along the path of movement described.

The supply and take-up reels 11 and 12 are driven respectfully by electric motors M–1 and M–2. These motors are energized from a suitable power supply 40 through adjustable resistors R–1 and R–2 respectively. The arrangement is such that the speed of each motor varies with the effective resistance of the associated variable resistor R–1 or R–2 in its power supply circuit.

Each of these variable resistors may be constituted by a continuously-wound resistance element which is contacted by a movable contact arm, or by a resistance element having a plurality of taps thereon which are contacted by a movable contact arm, or by plurality of resistors which are connected individually to snap-acting switches which, when operated by a movable operator, connect such resistors in or out of the power supply circuit for the corresponding reel motor.

A pivoted finger 19 is associated with the roll 10*a* of magnetic tape on the supply reel 11. The free end of this finger 19 bears against the outermost layer of this roll of tape on the supply reel. The finger 19 is suitably coupled to the adjustable contact of the resistor R–1 so that, as the tape is unwound from the supply reel and the diameter of the roll 10*a* thereon decreases, the resulting change in the angular position of finger 19 produces a change in the setting of the adjustable contact of resistor R–1 and the effective resistance in the energization circuit for the supply reel motor M–1 is progressively increased. Consequently, the power input to motor M–1 is decreased and the motor tends to slow down as the tape is unwound from the supply reel. As already stated, the supply reel is driven in the reverse direction.

A similar pivoted arm 20 has its free end bearing against the outside of the roll 10*b* of tape on the take-up reel 12. This arm 20 is suitably coupled to the adjustable contact of resistor R–2. The arrangement is such that, as the tape is wound up on the take-up reel and the diameter of the roll 10*b* of tape thereon increases, the effective resistance in the energization circuit for the take-up reel motor M–2 decreases because the motor has to supply an increased torque to maintain the tape tension constant while the amount of tape on the take-up reel is increasing. As stated, the take-up reel is driven in the forward direction and is over-driven with respect to the reverse rotating supply reel.

It is intended that the conjoint result of these actions will be to drive the take-up and supply reels at rotational speeds which gradually vary in a manner so as to tend to maintain the linear speed of the tape and the tension in the tape substantially constant as the tape is unwound from the supply reel and wound up on the take-up reel.

Turning now to FIGURE 2, in accordance with the present invention, the mechanical coupling between the tape roll engaging finger and the corresponding variable resistor for the respective reel motor includes a lost-motion coupling, which preferably is as shown schematically in FIGURE 2.

As shown in this figure, the finger 19 which has its free end engaging the outermost layer of the tape roll 10*a* on the supply reel 11, is fixed at its opposite end to a rotatably mounted shaft 24. Also fixed to the shaft 24 is a lever 25 which has a pin 26 projecting from its free end and extending substantially parallel to the shaft 24. This pin 26 is received loosely in a substantially larger hole 27 formed in a rocker arm 28. The rocker arm 28 at its middle carries a suitable ball bearing assembly 29 which rotatably receives the shaft 24. At the opposite side of the shaft 24 the arm 28 presents a free end 30 which is suitably coupled mechanically to the adjustable contact of resistor R–1. A block 31 presents a friction pad 32 which engages the rocker arm 28. Alternatively, a suitable blade spring may be mounted on the block 31 in place of the friction pad to provide suitable friction for maintaining the rocker arm 28 in the angular position to which it is moved. Obviously, with this arrangement rocking movement of the rocker arm 28 will produce a corresponding change in the position of its free end 30, and this is imparted through a suitable mechanical coupling to the variable resistor R–1 in the energization circuit for the supply reel motor M–1. Such coupling may be either a direct coupling, gearing or any other suitable arrangement.

The hole 27 in the rocker arm is larger in diameter than the pin 26 by an amount approximately equal to, or slightly greater than, the maximum amplitude of oscillation of the pin 26 which can be expected to arise from eccentricities in the tape roll on the supply reel as the latter rotates.

Where no such eccentricity is present, the tape-engaging finger 19 will have a smooth angular movement as the tape is gradually unwound from the supply reel. In such event, the pin 26 will stay in engagement with one side of the hole 27, so that such angular movement of the tape-engaging finger 19 will be imparted to the rocker arm 28. However, where there are such eccentricities, the pin 26, in addition to its steady progressive motion, will have some superimposed oscillation. However, because of the lost-motion connection provided by the oversized hole 27, the position of the rocker arm 28 will always correspond to the maximum excursion of movement of the pin 26. When, in the process of such oscillation, the pin 26 retreats from its maximum excursion the rocker arm 28 does not follow such retreat of the pin but maintains its position because of the clearance provided by the oversized hole 27 and the holding friction between the rocker arm 28 and the block 31. Thus, when the rocker arm has taken up a position in which the power input to the supply reel motor M–1 has been decreased, the power input to this motor remains constant until there is another change of such power caused by a new maximum excursion of the pin 26. Accordingly, with this novel and advantageous arrangement, the effects of eccentricities are not reflected as variations in the input power to the supply reel motor. Also, this eliminates any tendency for arcing at the contacts in the power supply circuit.

A similar arrangement is provided for the take-up reel motor, which need not be described in detail.

If desired, instead of controlling the input power to the respective reel motor, the rocker arm 28 may by its angular position control the driving torque applied to the respective reel, or it may be arranged to control a suitable brake, such as a magnetic fluid brake, associated with the respective reel. Also, the lost-motion coupling may take a form different from that shown in FIGURE 2.

Accordingly, it is to be understood that, while there has been described in detail herein and illustrated in the accompanying drawings a specific presently-preferred embodiment of this invention, various modifications, omissions and refinements which depart from the disclosed embodiment may be adopted without departing from the spirit and scope of the present invention.

Having thus described our invention, we claim:

1. In a reeling apparatus, the combination of a rotary reel on which an elongated flexible web is wound in a roll, a pivoted finger in continuous engagement with the outside of said roll on the reel and movable angularly in one direction as the size of said roll changes during the rotation of the reel, means for selectively varying the rotational speed of the reel in accordance with the angular position of said finger, and a lost-motion coupling between said finger and said speed-varying means which is operative to position said speed-varying means in accordance with the maximum excursion of said finger angularly in said one direction to control the rotational speed of the reel accordingly and which is operative to prevent retracting movements of the finger angularly away from its maximum excursion in said one direction from being transmitted to said speed-varying means, whereby such retracting movements do not affect said speed-varying means, said lost-motion coupling comprising a rotatable shaft connected to said finger to move angularly therewith, a pin having a rigid connection to said shaft and extending in spaced parallel relationship with respect thereto, a rocker arm which rotatably receives said shaft, said rocker arm at one side of the shaft having an opening therein which receives said pin and which is substantially larger than said pin for lost-motion of the pin with respect to the rocker arm, said rocker arm being coupled to said speed-varying means so that the angular position of the rocker arm determines the operation of said speed-varying means, and means frictionally engaging the rocker arm and restraining it against angular movement.

2. The apparatus of claim 1 wherein said opening in the rocker arm permits free movement of said pin therein in an amount at least equal to the maximum amount of the retracting movement of said finger caused by eccentricities of the roll on the reel.

References Cited in the file of this patent

UNITED STATES PATENTS

| | | |
|---|---|---|
| 1,629,029 | Garbutt | May 17, 1927 |
| 1,992,706 | Lira | Feb. 26, 1935 |
| 2,498,234 | Baker et al. | Feb. 21, 1950 |
| 2,580,717 | Ballou | Jan. 1, 1952 |